United States Patent [19]

Miyaji et al.

[11] Patent Number: 5,694,605
[45] Date of Patent: Dec. 2, 1997

[54] PROGRAM TRANSLATOR WITH SELECTIVE DATA VALUE AMENDMENT AND PROCESSOR WITH DATA EXTENSION INSTRUCTIONS

[75] Inventors: Shinya Miyaji, Nara; Masato Suzuki, Toyonaka; Hiroshi Kamiyama, Moriguchi, all of Japan

[73] Assignee: Matsushita Electric Industrial, Osaka, Japan

[21] Appl. No.: 249,460

[22] Filed: May 26, 1994

[30] Foreign Application Priority Data

May 27, 1993 [JP] Japan ................................. 5-126213

[51] Int. Cl.⁶ .................................................. G06F 7/38
[52] U.S. Cl. .............................................. 395/705; 364/748
[58] Field of Search ........................... 395/650, 700, 395/705; 364/748

[56] References Cited

U.S. PATENT DOCUMENTS 4,879,676 11/1989 Hansen ................................. 364/748
5,307,301 4/1994 Sweedler .............................. 364/748
5,440,702 8/1995 Brewer et al. ........................ 395/375

FOREIGN PATENT DOCUMENTS 54-117646 9/1979 Japan .

*Primary Examiner*—Kevin A. Kriess
*Assistant Examiner*—John Q. Chavis
*Attorney, Agent, or Firm*—Price, Gess & Ubell

[57] ABSTRACT

A program translator has the following units:

An option direction unit for directing a code generation unit to generate or not to generate an amendment instruction to compensate an overflow in an arithmetic operation.

A code generation unit for generating an amendment instruction to compensate an overflow by discriminating the type of a data variable to be an operand for an arithmetic operation of a machine instruction when effective width of the data variable designated by an operand is smaller than the width of a register to store the data variable and when an overflow may be caused.

8 Claims, 8 Drawing Sheets

Fig. 4 symbol table

| symbols | variable types | | bytes | leading addresses | registers |
|---|---|---|---|---|---|
| | signs | types | | | |
| a | signed | character | 1 | 1000 | |
| b | unsigned | character | 1 | 1001 | |
| c | signed | integer | 2 | 1002 | |
| d | unsigned | integer | 2 | 1004 | |
| | | | | | |

Fig. 8 symbol table

| symbols | variable types | | bytes | leading addresses | registers |
| --- | --- | --- | --- | --- | --- |
| | signs | types | | | |
| a | signed | character | 1 | 1000 | |
| b | unsigned | character | 1 | 1001 | |
| c | signed | short integer | 2 | 1002 | |
| d | unsigned | short integer | 2 | 1004 | |
| | | | | | |

PROGRAM TRANSLATOR WITH SELECTIVE DATA VALUE AMENDMENT AND PROCESSOR WITH DATA EXTENSION INSTRUCTIONS

BACKGROUND OF THE INVENTION (1) Field of the Invention

The present invention relates to a program translator for translating high-level language programs into machine language, and to a processor for processing machine language programs.

(2) Description of the Prior Art

Along with the development of electronics technology, data processors such as micro computers have been widely used.

The conventional processors can be classified into CISC (Complex Instruction Set Computers) processors supporting a large number of instructions or RISC (Reduced Instruction Set Computers) processors supporting far fewer instructions to achieve high-speed processing. The CISC processors include TRON-spec. chips and MC68040 whereas the RISC processors include SPARC and MIPS. Most of the conventional processors have 32-bit registers and a 32-bit calculator.

In a 32-bit CISC processor, the arithmetic instructions can manipulate 8, 16, or 32 bits of data, so that a compiler for the CISC processor (hereinafter CISC compiler) generates various instructions (codes) in accordance with the various data width. For example, when an 8-bit character type data variable or 16-bit short integer type data variable is stored to the 32-bit registers, instructions are generated so that the variable is stored to the lower 8 bits or the lower 16 bits respectively without updating the higher 24 bits or the higher 16 bits respectively.

The large number of instructions requires the CISC processor to have large and complicated hardware to decode and to execute these instructions.

This disadvantage of the CISC processors has been resolved by the RISC processors. The types of instructions supported by the RISC processors are much fewer and there is no instruction that updates only the lower 8 bits or the lower 16 bits.

Accordingly, an instruction (code) to be generated by a compiler for a RISC processor (hereinafter RISC compiler) to store an 8-bit character type data variable or 16-bit short integer type data variable to the 32-bit register updates all the bits in the register.

After the instruction is generated, the RISC compiler has to generate another instruction to amend the higher 24 bit data or the higher 16 bit data so that the updated data variable can be an 8-bit character type data variable or a 16-bit short integer type data variable. This is to compensate overflow which might be caused by arithmetic operations for data variables. To be more specific, the possible data variable ranges are as follows (numbers are all decimal).

−128 to +127 for signed character type data variables 0 to +255 for unsigned character type data variables −32768 to +32767 for signed short integer type data variables 0 to +65535 for unsigned short integer data variables However, data variables stored in the 32-bit register may get out of the above-mentioned range in the event of an arithmetic operation. For example, when 2 is added to the value +127 stored in the register which is allocated to signed character type data variable, the result becomes +129, which is out of the range.

In order to solve the problem, every time the data of the register is updated by an arithmetic operation, the RISC compiler generates codes into which the following amendment instructions are unconditionally inserted.

(1) a 24-bit left shift instruction and a 24-bit arithmetic right shift instruction for singed character type data variables (2) a 24-bit left shift instruction and a 24-bit logical right shift instruction for unsigned character type data variables (3) a 16-bit left shift instruction and a 16-bit arithmetic right shift instruction for signed short integer type data variables (4) a 16-bit left shift instruction and a 16-bit logical right shift instruction for unsigned short integer type data variables The left shift is a shift in the direction of the MSB, the arithmetic right shift is a shift in the direction of the LSB in which the value of the MSB is maintained, and the logical right shift is a shift in the direction of LSB in which the value of the MSB is set 0. In the above-mentioned example, the value +129 (100000001 in binary) stored in the register is changed to 1 because a value 1 in the MSB flows by the 24-bit arithmetic right shift.

However, the conventional RISC processors have the following drawbacks.

The above-explained amendment instructions are frequently used in programs manipulating the character type data variables or short integer type data variables, as a result of being compiled by the RISC compiler. This leads to the increase in the code size of machine language programs and in program execution time.

In addition, the amendment instruction has no effects when programs with no overflow are executed or when overflows can be avoided by programmers' checking the value range for each data variable.

Furthermore, in a system where the data width of the register is beyond the data width of integer type variables, the above-mentioned problem is caused not only by character type data variables or short integer type data variables but integer type data variables. This still more increases the code size and decreases program execution speed because usually the integer type is most frequently used.

Although the amendment instructions are effective when programmers cannot avoid the occurrence of overflows or are not conscious of the occurrence, they exert serious influence especially upon the code size and the program execution speed in the system where the data width of the register is beyond the data width of integer type variables because they are composed of left shift instructions and arithmetic or logical right shift instructions.

SUMMARY OF THE INVENTION

In view of the foregoing problems, an object of the present invention is to provide a program translator which does not increase the code size of machine language programs when a program with no overflow is executed or when the overflow can be avoided by programmers, regardless of the data variable types.

Another object of the present invention is to provide a processor capable of executing a machine language program in high speed, which is generated by the above-mentioned program translator.

The program translator of the present invention generates machine language programs from high-level language program. The machine language programs are executed by a processor which deals with address having a first data width larger than a second data width of data for an arithmetic operation. The option direction holding unit holds a direction indicating to compensate or not to compensate overflows in arithmetic instructions. The code generation unit, if the option direction holding unit presently holds a direction to indicate that overflows are compensated, judges a type of a data variable to be an operand for an arithmetic operation, when effective data width of the data variable designated by an operand being smaller than the data width of a register to store the data variable and when an overflow may be caused. Then, the code generation unit generates an amendment instruction to compensate the overflow, based on the result of the judgement.

The code generation unit may include an instruction selection unit, a variable detection unit, a sign extension instruction generation unit, and a zero extension instruction generation unit.

The instruction selection unit selects arithmetic instructions that may fall into an overflow from all the machine language instructions that can be generated.

The variable detection unit determines effective data width of a data variable in the selected arithmetic instruction, and judges whether the data variable is signed or unsigned.

When it is a signed variable, the sign extension instruction generation unit generates an amendment instruction to fill the higher bits than the effective data width with the same logical value as the sign bit.

On the other hand, when it is an unsigned variable, the zero extension instruction generation unit generates an amendment instruction to fill the higher bits than the effective data width with zeros as a logical value.

The above explained program translator of the present invention can prevent the increase the code size of machine language programs when a program with no overflow is executed or when the overflow can be avoided by programmers, regardless of the data variable types, and further can prevent the decrease in execution speed.

The above-mentioned processor of the present invention may include the following units.

An instruction decoding unit for decoding the machine language instructions including amendment instructions.

A plurality of registers having a first data width for storing data having a second data width, the data being necessary for arithmetic operations.

A calculator for performing a predetermined arithmetic operation with the data stored in the register, based on an arithmetic instruction decoded by the decoding unit.

An amendment unit for extending effective data width of the data to the first data width.

According to the processor, the decrease in the program execution speed can be restrained even when programmers cannot avoid overflows of data variables or when they are not conscious of the occurrence of overflows.

BRIEF DESCRIPTION OF THE DRAWINGS

These and other objects, advantages, and features of the invention will become apparent from the following description thereof taken in conjunction with the accompanying drawings which illustrate a specific embodiment of the invention. In the drawings.

DESCRIPTION OF THE PREFERRED EMBODIMENTS

<EMBODIMENT 1>

Figure 1:
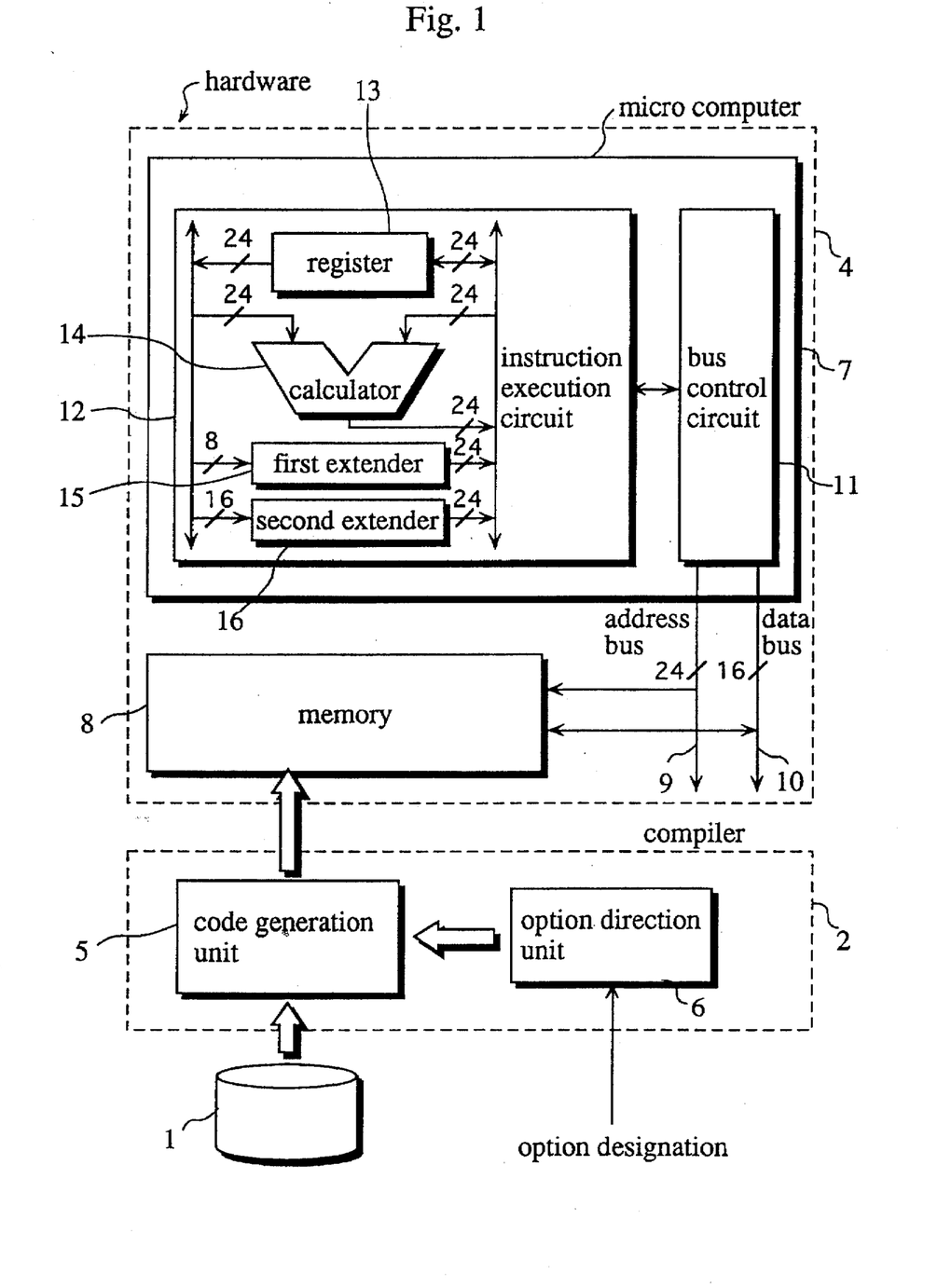
FIG. 1 is a block diagram showing the construction of the program translator and the processor of Embodiment 1 of the present invention.

In FIG. 1 showing the construction of the program translator and the processor of this embodiment, a storage unit 1 stores C language programs, a compiler 2 (program translator) compiles the C language programs into machine language programs, and hardware 4 executes object codes generated by the compiler 2.

The compiler 2 is composed of a code generation unit 5 for generating object codes from the C language program, and an option direction unit 6 for inquiring of the user about the necessity of overflow compensation and for directing the code generation unit 5 to insert or not to insert an amendment code.

The hardware 4 is provided with a micro computer 7, and memory 8 for storing the object codes and data to be used for programs. The micro computer 7 and the memory 8 are connected to each other via a 24-bit address bus 9 and a 16-bit data bus 10.

The micro computer 7 is composed of a bus control circuit 11 for controlling the address bus 9 and the data bus 10, thereby fetching instructions stored in the memory 8 and further reading/writing data therefrom/thereto, and an instruction execution circuit 12 for receiving instructions from the bus control circuit 11 to decode and execute them.

The instruction execution circuit 12 includes some 24-bit registers 13, a 24-bit calculator 14 for performing arithmetic and logical operations with data stored in the register 13, a first extender 15 for sign-extending or zero-extending the lower 8 bits of data stored in the register 13 as far as 24 bits, and a second extender 16 for sign-extending or zero- extending the lower 16 bits of the data stored in the register 13 as far as 24 bits.

Figure 2:
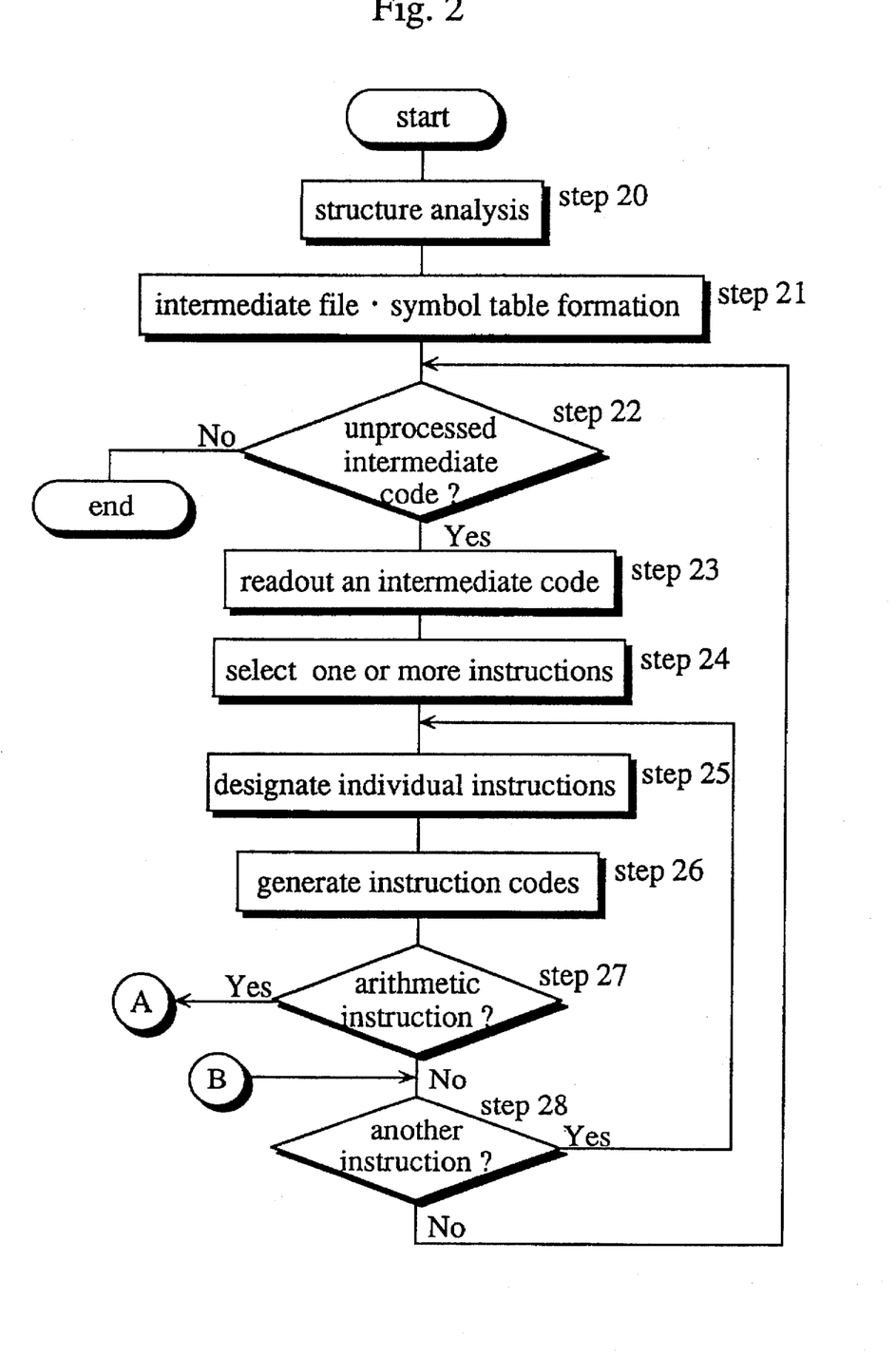
FIG. 2 is a flowchart showing the process in the code generation unit of Embodiment 1.
Figure 3:
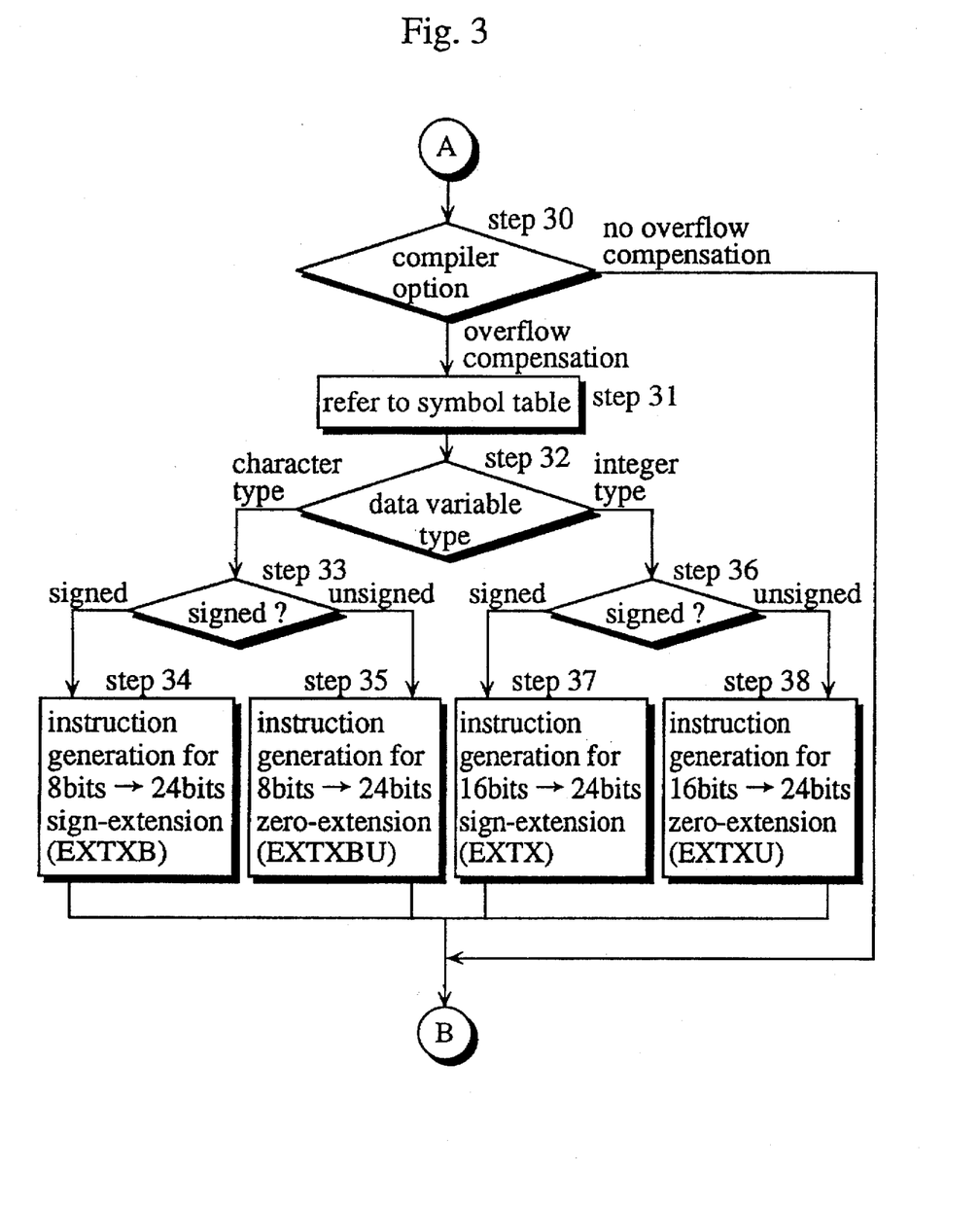
FIG. 3 is a flowchart showing the option process in the code generation unit of Embodiment 1.

FIGS. 2 and 3 show flowcharts showing the process carried out by the code generation unit 5.

At Step 20 in FIG. 2, a C language program is taken out from the storage unit 1 and its language structure is grammatically analyzed, so that an intermediate file is generated which is composed of intermediate instructions and intermediary format sentences written in intermediary format language.

Figure 4:
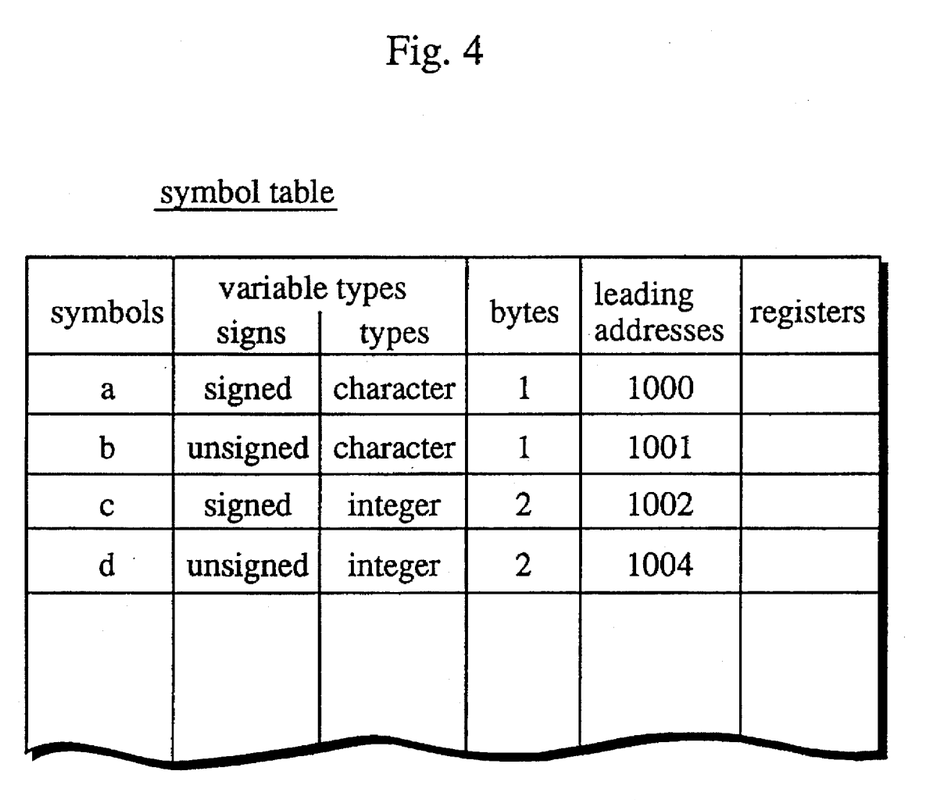
FIG. 4 is a symbol table generated by the code generation unit of Embodiment 1.

At Step 21, data variables are extracted from the intermediate file, and a variable table (symbol table) containing information on each of the data variables is formed, as shown in FIG. 4. The information includes symbols for data values, variable types (signed or unsigned and character type or integer type), byte numbers, and leading addresses of symbols allocated in the memory.

At Step 22, it is judged whether there is any intermediate instruction that has not been through code generation process or not from the intermediate file. If there is, the flow goes to Step 23, and otherwise code generation is terminated.

At Step 23, an intermediate instruction to be next processed is read from the intermediate file.

At Step 24, one or more machine language instructions are selected to realize an intermediate instruction.

At Step 25, a machine language instruction to be next processed is designated from the machine language instructions selected in Step 24.

At Step 26, the instruction code for the designated machine language instruction (hereinafter individual instruction) is generated.

At Step 27, it is judged whether the generated instruction is for an arithmetic operation or not, i.e., whether it is possible for overflows to occur or not. If it is, the flow proceeds to Step 30, and otherwise goes to Step 28.

At Step 28, it is judged whether there is any machine language instruction to be next processed. If there is, the flow goes back to Step 25, and otherwise goes back to Step 22.

At Step 30 in FIG. 3, it is judged whether the option direction unit 6 received a request for overflow compensation from the user. If it does, the flow proceeds to Step 31, and otherwise goes back to Step 28.

At Step 31, the variable type of the individual instruction is determined by referring to the symbol table.

At Step 32, it is judged whether the individual instruction is character type or integer type. If it is character type, the flow goes to Step 33, and otherwise proceeds to Step 36.

At Step 33, it is judged whether a character type variable is signed or unsigned. If it is signed, the flow goes to Step 34, and otherwise proceeds to Step 35.

At Step 34, a signed character type variable is sign-extended. In other words, an instruction with the smallest word length is generated to sign-extend the 8-bit signed character type variable as far as 24 bits.

At Step 35, an unsigned character type variable is zero-extended. In other words, an instruction with the smallest word length is generated to zero-extend the 8-bit unsigned character type variable as far as 24 bits.

At Step 36, it is judged whether an integer type variable is signed or unsigned. If it is signed, the flow goes to Step 37, and otherwise proceeds to Step 38.

At Step 37, a signed integer type variable is sign-extended. In other words, an instruction with the smallest word length is generated to sign-extend the 16-bit signed integer type variable as far as 24 bits.

At Step 38, an unsigned integer type variable is zero-extended. In other words, an instruction with the smallest word length is generated to zero-extend the 16-bit unsigned integer type variable as far as 24 bits.

The operations of the compiler 2 and the hardware 4 constructed as explained above are described as follows. To simplify the explanation, the following C language program is used as an example.

```
main ( )
{
    char        a ;
    unsigned char   b ;
    int         c ;
    unsigned int    d ;
    a = a + 1 ;
    b = b + a ;
    c = c + b ;
    d = d + c ;
}
```

The C language program is read out from the storage unit 1 by the code generation unit 5 and its language structure is analyzed in accordance with C language grammar. Based on the analysis, the code generation unit 5 generates an intermediate file written in the intermediary format language (Step 20).

The contents of the intermediate file is shown below; however, it is revised so that the description of the intermediary format is understood.

| intermediary format sentence 1 : | (char a) |
| intermediary format sentence 2 : | (unsigned char b) |
| intermediary format sentence 3 : | (int c) |
| intermediary format sentence 4 : | (unsigned int d) |
| intermediate instruction 1 : | (a = a + 1) |
| intermediate instruction 2 : | (b = b + a) |
| intermediate instruction 3 : | (c = c + d) |
| intermediate instruction 4 : | (d = d + c) |

In the event of an intermediate file input, the code generation unit 5 extracts data variables in the file (including non-declared data variables), determines the variable types, and allocates the variables to the memory 8 if necessary, thereby forming the symbol table shown in FIG. 4 (Step 21).

Variables "a", "b", "c", and "d", which are explicitly declared are extracted from the intermediary format sentences 1–4. The variable type for each variable is determined based on the declaration and then registered to the symbol table and further allocated in the memory 8. In this case, the variables "a", "b", "c", and "d" are allocated to the areas corresponding to 1 byte starting from an address 1000, 1 byte starting from an address 1001, 2 bytes starting from an address 1002, and 2 bytes starting from an address 1004 respectively. The contents of the symbol table is dynamically updated in the event of any change. The symbol table shown in FIG. 4 indicates the contents at this time.

After this, the code generation unit 5 generates machine language instructions corresponding to each of the intermediate instructions as follows.

(1) When overflow compensation is not requested

The code generation unit 5 reads out a leading intermediate instruction among unprocessed intermediate instructions (Step 23), and selects one or more machine language instructions to realize the read intermediate instruction (Step 24).

The instruction selecting procedure is described as follows.

The intermediate instruction 1 ($a=a+1$) indicates (1) to read 1-byte data starting from the address 1000 where the signed character type variable "a" is allocated, (2) to add 1 to the data, and (3) to store it to the address 1000. The code generation unit 5 selects machine instructions corresponding (1)–(3) so as to realize the instruction. That is, three instructions are selected: (1) MOVB instruction for reading out the 1-byte data starting from the address 1000 and storing it to the data register, (2) ADD instruction for adding 1 to the data stored in the data register, and (3) MOVB instruction for returning the add operation result to the address 1000. The data register is assumed to be allocated D0.

With no overflow compensation request, the code generation unit 5 generates the following instructions 1–3 by providing three individual instructions with three time loop processes (Steps 24–28).

| instruction 1 | : | address 100000 | MOVB | @1000, D0 |
| instruction 2 | : | address 100004 | ADD | #1, D0 |
| instruction 3 | : | address 100006 | MOVB | D0, @1000 |

In the same manner, the code generation unit 5 generates the following instructions 4–6 from the intermediate instruction 2 (b=b+a).

| instruction 4 | : | address 100009 | MOVBU | @1000, D1 |
| instruction 5 | : | address 10000c | ADD | D0, D1 |
| instruction 6 | : | address 10000d | MOVB | D1, @1001 |

In the same manner, the code generation unit 5 generates the following instructions 7–9 from the intermediate instruction 3 (c=c+d).

| instruction 7 | : | address 100010 | MOV | @1002, D0 |
| instruction 8 | : | address 100013 | ADD | D1, D0 |
| instruction 9 | : | address 100014 | MOV | D0, @1002 |

In the same manner, the code generation unit 5 generates the following instructions 10–12 from the intermediate instruction 4 (d=d+c).

| instruction 10 | : | address 100017 | MOVU | @1004, D1 |
| instruction 11 | : | address 10001b | ADD | D0, D1 |
| instruction 12 | : | address 10001c | MOV | D1, @1004 |

These instructions 1–12 are written in mnemonic object codes (assembly language) for convenience and are described in binary when stored in the memory 8. All these numbers appearing above are hexadecimal. It is assumed that the instructions 1–12 are allocated to 31 bytes extending between the addresses 100000 and 10001e. No instruction is generated for compensating overflows.

Then, these object codes are executed by the micro computer 7 as follows.
(instruction 1)
Data for 8 bits in the variable "a" are read out from an address 001000 in the memory 8 by the bus control circuit 11, sign-extended as far as 24 bits, and stored in the D0 register in the register 13.
(instruction 2)
1 is added to the data stored in the D0 register by the calculator 14, and the calculated result is again stored in the D0 register. The ADD operation is intended for all the 24 bits.
(instruction 3)
The lower 8 bits of the data stored in the D0 register is written to an address 001000 in the memory 8 by the bus control circuit 11.
(instruction 4)
Data for 8 bits in the variable "b" are read out from an address 001001 in the memory 8 by the bus control circuit 11, zero-extended as far as 24 bits, and stored in the D1 register in the register 13.

(instruction 5)
Data in the D1 register are added to the data stored in the D0 register by the calculator 14, and the calculated result is again stored in the D1 register. Before the ADD operation, the D0 register stores data of the variable "a", which have been updated by the instruction 2. The ADD operation is intended for all the 24 bits.
(instruction 6)
The lower 8 bits of the data stored in the D1 register is written to an address 001001 in the memory 8 by the bus control circuit 11.
(instruction 7)
Data for 16 bits in the variable "c" are read out from an address 001002 in the memory 8 by the bus control circuit 11, sign-extended as far as 24 bits, and stored in the D0 register in the register 13.
(instruction 8)
Data in the D0 register are added to the data stored in the D1 register by the calculator 14, and the calculated result is again stored in the D0 register. Before the ADD operation, the D1 register stores data of the variable "b", which have been updated by the instruction 5. The ADD operation is intended for all the 24 bits.
(instruction 9)
The lower 16 bits of the data stored in the D0 register is written to an address 001002 in the memory 8 by the bus control circuit 11.
(instruction 10)
Data for 16 bits in the variable "d" are read out from an address 001004 in the memory 8 by the bus control circuit 11, zero-extended as far as 24 bits, and stored in the D1 register in the register 13.
(instruction 11)
Data in the D1 register are added to the data stored in the D0 register by the calculator 14, and the calculated result is again stored in the D1 register. Before the ADD operation, the D0 register stores data of the variable "c", which have been updated by the instruction 8. The ADD operation is intended for all the 24 bits.
(instruction 12)
The lower 16 bits of the data stored in the D1 register is written to an address 001004 in the memory 8 by the bus control circuit 11.

Thus, the C language program is compiled by the compiler 2, and generated object codes are executed in the micro computer 7. Since no instruction is generated to compensate overflows, there are no increase in code size and no decrease in execution speed.
(2) When overflow compensation is requested
The code generation unit 5 operates in the same manner as the above explained case (1) except that overflow compensation is executed in Step 30. In Step 30, overflow is compensated if individual instruction generation carried out at Step 27 is for an arithmetic operation, and accordingly, process after the generation is different as follows.

| instruction 2 | : | ADD | #1, D0 |
| instruction 5 | : | ADD | D0, D1 |
| instruction 8 | : | ADD | D1, D0 |
| instruction 11 | : | ADD | D0, D1 |

The process after the instruction generation is described as follows.
(Overflow compensation for the instruction 2)
After the instruction 2 is generated (Step 26), the code generation unit 5 refers to the symbol table because it is an arithmetic instruction (Step 27) and overflow compensation is designated (Step 30). At this point, in the symbol table, the D0 register is assigned to the variable "a". As a result, it becomes apparent that the a variable "a" is a signed character type variable (Steps 31, 32, and 33). Accordingly, the code generation unit 5 generates an instruction 2' with smallest word length in order to sign-extend the 8-bit variable "a" in the D0 register as far as 24 bits (Step 34).

instruction 2': EXTXB D0

(Overflow compensation for the instruction 5)

After the instruction 5 is generated (Step 26), the code generation unit 5 refers to the symbol table because it is an arithmetic instruction (Step 27) and overflow compensation is designated (Step 30). At this point, in the symbol table, the D1 register is allocated to the variable "b". As a result, it becomes apparent that the variable "b" is an unsigned character type variable (Steps 31, 32, and 33). Accordingly, the code generation unit 5 generates an instruction 5' with smallest word length in order to zero-extend the 8-bit variable "b" in the D1 register as far as 24 bits (Step 35).

instruction 5': EXTXBU D1

(Overflow compensation for the instruction 8)

After the instruction 8 is generated (Step 26), the code generation unit 5 refers to the symbol table because it is an arithmetic instruction (Step 27) and overflow compensation is designated (Step 30). At this point, in the symbol table, the D0 register is allocated to the variable "c". As a result, it becomes apparent that the a variable "c" is a signed integer type variable (Steps 31, 32, and 33). Accordingly, the code generation unit 5 generates an instruction 8' with smallest word length in order to sign-extend the 16-bit variable "c" in the D0 register as far as 24 bits (Step 37).

instruction 8': EXTX D0

(Overflow compensation for the instruction 11)

After the instruction 11 is generated (Step 26), the code generation unit 5 refers to the symbol table because it is an arithmetic instruction (Step 27) and overflow compensation is designated (Step 30). At this point, in the symbol table, the D1 register is allocated to the variable "d". As a result, it becomes apparent that the variable "d" is an unsigned integer type variable (Steps 31, 32, and 33). Accordingly, the code generation unit 5 generates an instruction 11' with smallest word length in order to zero-extend the 16-bit variable "d" in the D1 register as far as 24 bits (Step 38).

instruction 11': EXTXU D1

According to these procedures, the code generation unit 5 generates the following object codes.

| instruction 1 | : | address 100000 | MOVB | @1000, D0 |
| instruction 2 | : | address 100004 | ADD | #1, D0 |
| instruction 2' | : | address 100006 | EXTXB | D0 |
| instruction 3 | : | address 100007 | MOVB | D0, @1000 |
| instruction 4 | : | address 10000a | MOVBU | @1001, D1 |
| instruction 5 | : | address 10000d | ADD | D0, D1 |
| instruction 5' | : | address 10000e | EXTXBU | D1 |
| instruction 6 | : | address 10000f | MOVB | D1, @1001 |
| instruction 7 | : | address 100012 | MOV | @1002, D0 |
| instruction 8 | : | address 100015 | ADD | D1, D0 |
| instruction 8' | : | address 100016 | EXTX | D0 |
| instruction 9 | : | address 100017 | MOV | D0, @1002 |
| instruction 10 | : | address 10001a | MOVU | @1004, D1 |
| instruction 11 | : | address 10001e | ADD | D0, D1 |
| instruction 11' | : | address 10001f | EXTXU | D1 |
| instruction 12 | : | address 100020 | MOV | D1, @1004 |

It is assumed that these instructions 1–12 are allocated in 35 bytes corresponding to the addresses 100000–100022 in the memory 8. The instructions 2', 5', 8', and 11' are amendment instructions for the signed character type data variable "a", the unsigned character type data variable "b", the signed integer type data variable "c", and the unsigned integer type data variable "d" respectively. These amendment instructions compensate overflows which may be caused in ADD instructions in the instructions 2, 5, 8, and 11 respectively.

After this, these object codes stored in the memory 8 are executed by the micro computer 7 as follows. Since the execution is almost the same as (1), the following description is limited to instructions different from (1).

(instruction 2')

The lower 8 bits of the data in the D0 register in the register 13 are sign-extended by the first extender 15, and the result is again stored in the D0 register.

(instruction 5')

The lower 8 bits of the data in the D1 register in the register 13 are zero-extended by the first extender 15, and the result is again stored in the D1 register.

(instruction 8')

The lower 16 bits of the data in the D0 register in the register 13 are sign-extended by the second extender 16, and the result is again stored in the D0 register.

(instruction 11')

The lower 16 bits of the data in the D1 register in the register 13 are zero-extended by the second extender 16, and the result is again stored in the D1 register.

The instructions 2, 5, 8, and 11, which may cause overflows are applied overflow amendment by the above-explained instructions 2', 5', 8', and 11' respectively.

Thus, C language programs are compiled by the compiler 2, and produced object codes are executed by the micro computer 7. Although the instructions 8' and 11' for compensating overflows are generated also for integer type data variables in this case, these instructions 8' and 11' as well as the instructions 2' and 5' for compensating overflow in character type data variables are composed of instructions having 1 byte word length so that the increase in code size and the decrease in execution speed are fairly low.

As explained hereinbefore, when programs with no overflow are compiled or when overflows can be avoided by programmers' checking the value range of each data variable, the increase in the code size of object codes and the decrease in execution speed can be prevented by users' providing the compiler 2 with option designation for not compensating overflows, regardless of the data variable type.

Furthermore, according to the present invention, the increase in the code size of object codes and the decrease in execution speed can be further reduced than before, ever if programmers cannot avoid overflows of data variables or they are not conscious of the occurrence of overflows, when the width of the register 13 (24 bits) exceeds the data width of integer type (16 bits).

Although the first and second extenders 15 and 16 are independent of the calculator 14 in the embodiment, the calculator 14 may include the functions of the extenders 15 and 16.

Although the address bus 9, the register 13, the calculator 14, and the first and second extenders 15 and 16 are set to output 24-bit data, and the width of pointer variables to be handled in the code generation unit 5 is set to 24 bits, these widths may be any bits between 17 bits and 31 bits in accordance with the breadth of the required address space as follows.

| required address space | data width |
| --- | --- |
| 128 kilobytes | 17 bits |
| 256 kilobytes | 18 bits |
| 512 kilobytes | 19 bits |
| 1 megabyte | 20 bits |
| 2 megabytes | 21 bits |
| 4 megabytes | 22 bits |
| 8 megabytes | 23 bits |
| 16 megabytes | 24 bits (the embodiment) |
| 32 megabytes | 25 bits |
| 64 megabytes | 26 bits |
| 128 megabytes | 27 bits |
| 256 megabytes | 28 bits |
| 512 megabytes | 29 bits |
| 1 gigabyte | 30 bits |
| 2 gigabytes | 31 bits |

These adjustment of width contributes to the elimination of hardware excess, thereby optimizing the cost and power consumption.

The address bus 9, the register 13, the calculator 14, the first and second extenders 15 and 16 are set to output 24-bit data, and the width of integer type data variables handled in the code generation unit 5 is set to 16 bits in the embodiment; however, other data width can be used as well.

By making the width of the integer type data variables be equal to the width (M bits) of data mainly treated by the program and making the width (N bits) of the pointer variables be larger than M, the data processor can deal with address space of N power of 2 which is larger than M power of 2.

Although C language programs are used in this embodiment, programs in any language can be executed by adjusting the compiler 2 to the language.

<EMBODIMENT 2>

Figure 5:
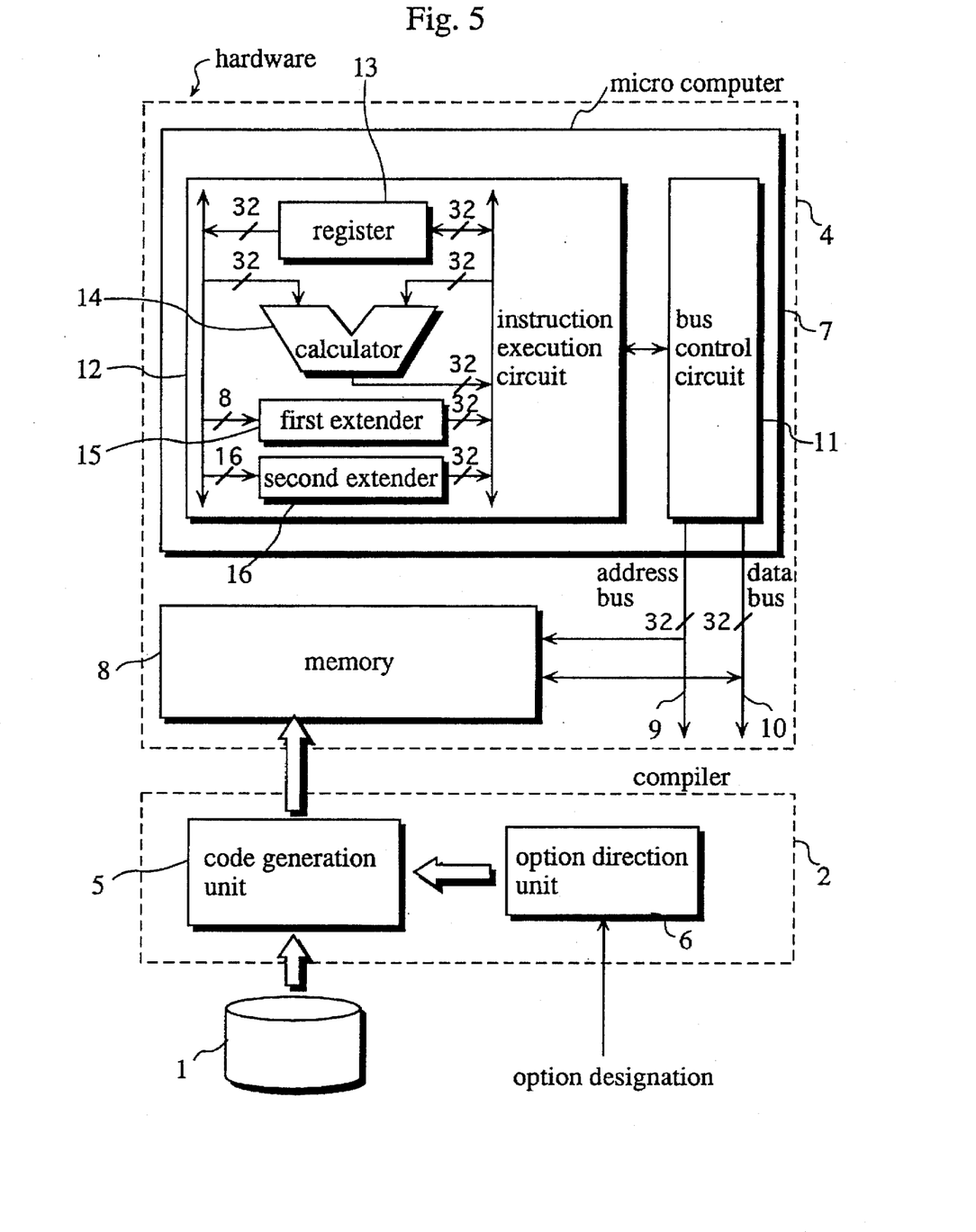
FIG. 5 is a block diagram showing the construction of the program translator and the processor of Embodiment 2 of the present invention.

In FIG. 5 showing the construction of the program translator and the processor of this embodiment, a storage unit 1 stores C language programs, a compiler 2 (program translator) compiles the C language programs into machine language programs, and hardware 4 executes object codes generated by the compiler 2.

The compiler 2 is composed of a code generation unit 5 for generating object codes from the C language program, and an option direction unit 6 for inquiring of the user about the necessity of overflow compensation and for directing the code generation unit 5 to insert or not to insert an amendment code.

The hardware 4 is provided with a micro computer 7, and memory 8 for storing the object codes and data to be used for programs. The micro computer 7 and the memory 8 are connected to each other via a 32-bit address bus 9 and a 32-bit data bus 10.

The micro computer 7 is composed of a bus control circuit 11 for controlling the address bus 9 and the data bus 10, thereby fetching instructions stored in the memory 8 and further reading/writing data therefrom/thereto, and an instruction execution circuit 12 for receiving instructions from the bus control circuit 11 to decode and execute them.

The instruction execution circuit 12 includes some 32-bit registers 13, a 32-bit calculator 14 for performing arithmetic and logical operations with data stored in the register 13, a first extender 15 for sign-extending or zero-extending the lower 8 bits of data stored in the register 13 as far as 32 bits, and a second extender 16 for sign-extending or zero- extending the lower 16 bits of the data stored in the register 13 as far as 32 bits.

Figure 6:
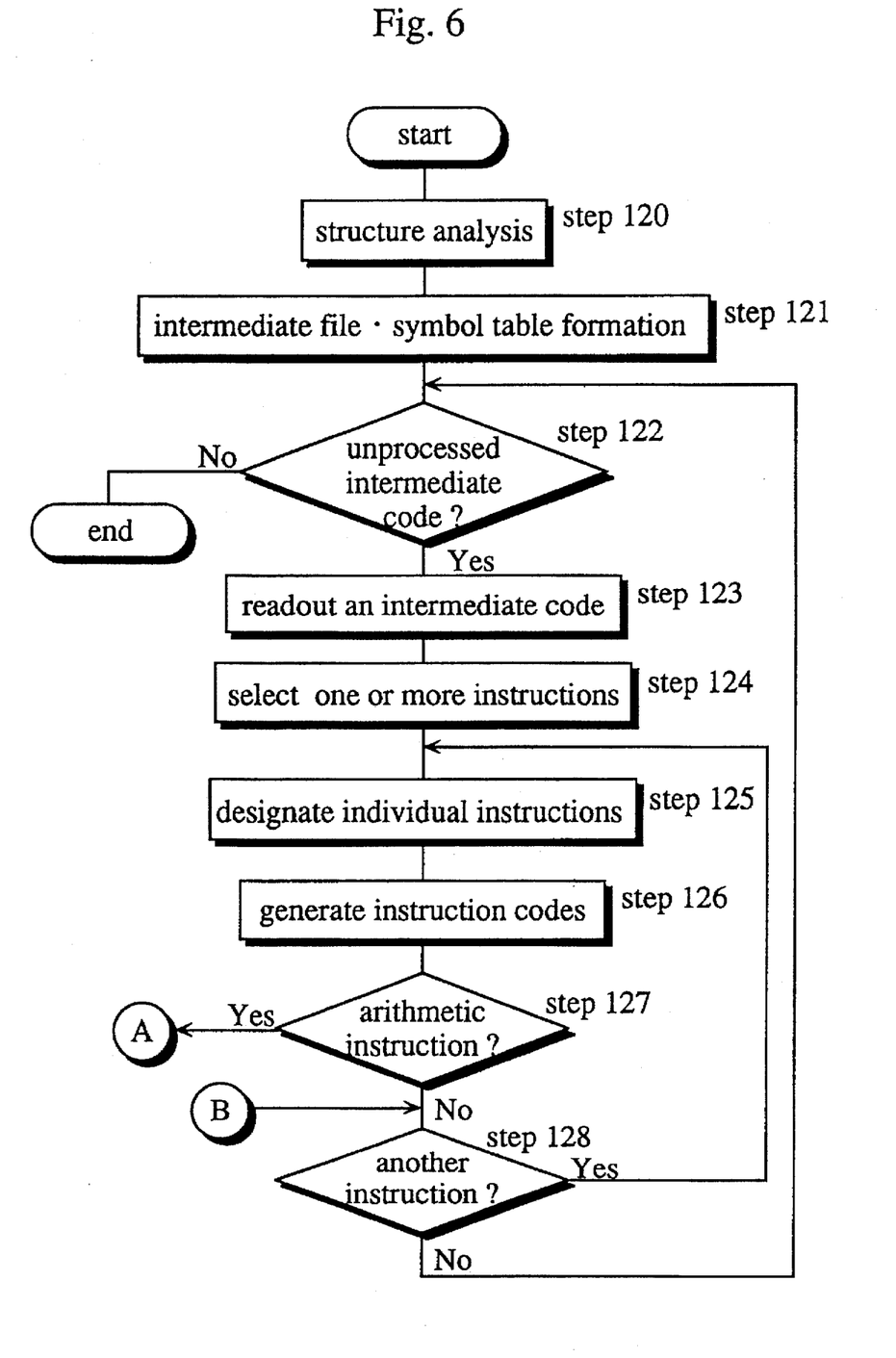
FIG. 6 is a flowchart showing the process in the code generation unit of Embodiment 2.
Figure 7:
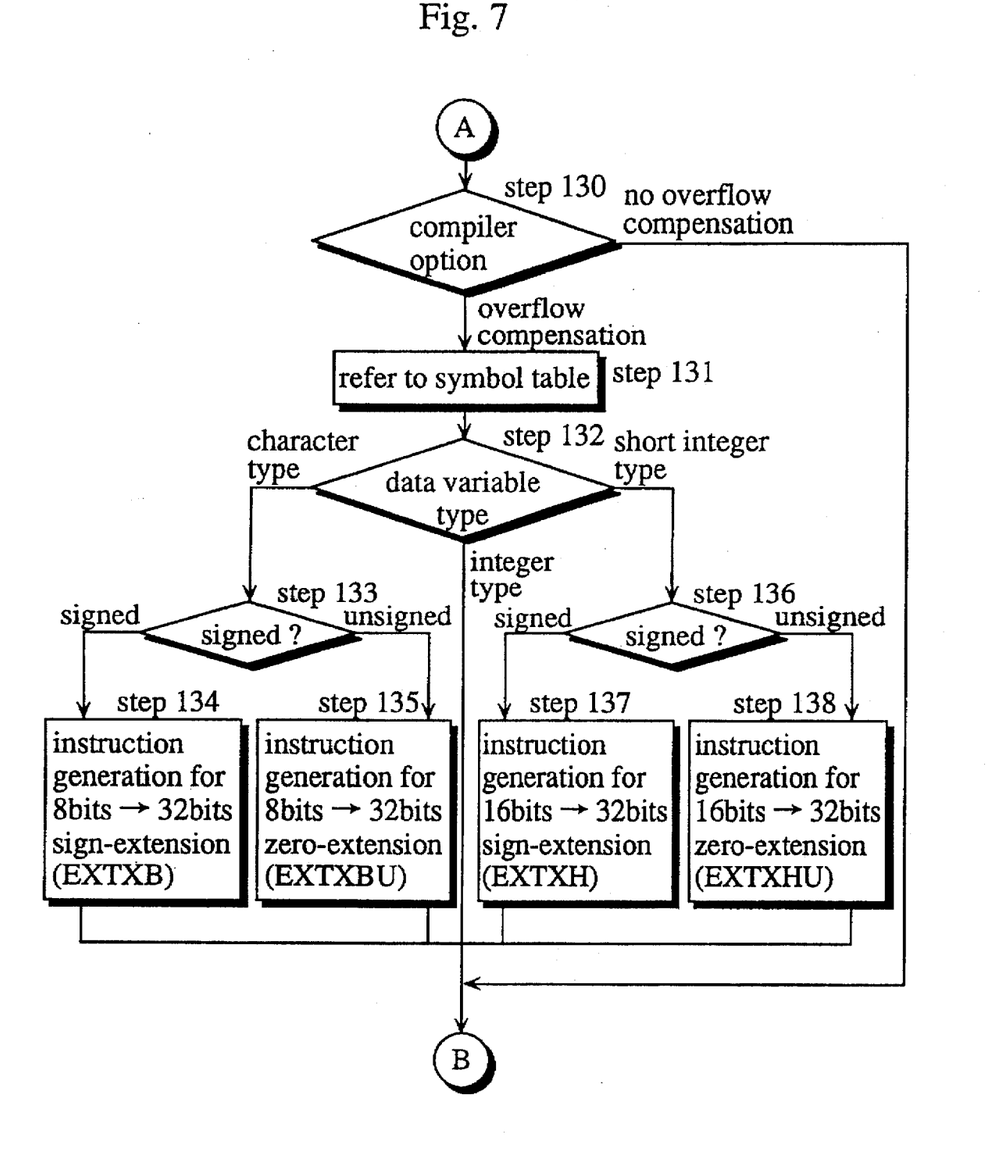
FIG. 7 is a flowchart showing the option process in the code generation of Embodiment 2.

FIGS. 6 and 7 show flowcharts showing the process carried out by the code generation unit 5.

At Step 120 in FIG. 6, a C language program is taken out from the storage unit 1 and its language structure is grammatically analyzed, so that an intermediate file is generated which is composed of intermediate instructions and intermediary format sentences written in intermediary format language.

Figure 8:
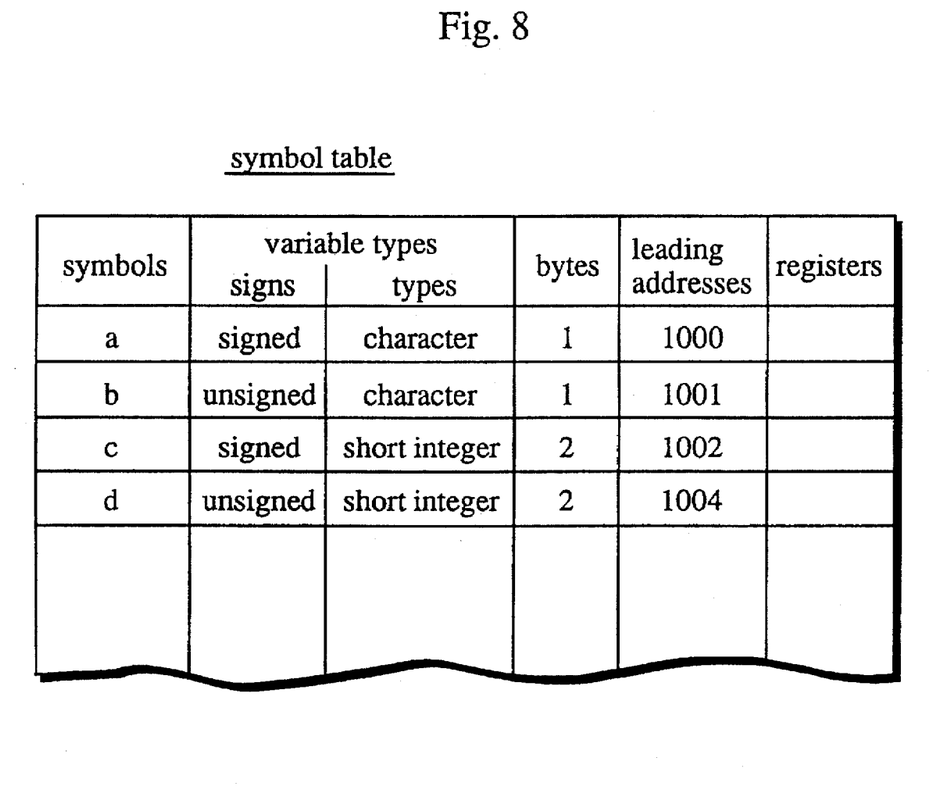
FIG. 8 is a symbol table generated by the code generation unit of Embodiment 2.

At Step 121, data variables are extracted from the intermediate file, and a variable table (symbol table) containing information on each of the data variables is formed, as shown in FIG. 8. The information includes symbols for data values, variable types (signed or unsigned and integer type (32 bits), short integer type (16 bits), or character type (8 bits)), byte numbers, and leading addresses of symbols allocated in the memory.

At Step 122, it is judged whether there is any intermediate instruction that has not been through code generation process or not from the intermediate file. If there is, the flow goes to Step 123, and otherwise code generation is terminated.

At Step 123, an intermediate instruction to be next processed is read from the intermediate file.

At Step 124, one or more machine language instructions are selected to realize an intermediate instruction.

At Step 125, a machine language instruction to be next processed is designated from the machine language instructions selected in Step 124.

At Step 126, the instruction code for the designated machine language instruction (hereinafter individual instruction) is generated.

At Step 127, it is judged whether the generated instruction is for an arithmetic operation or not, i.e., whether it is possible for overflows to occur or not. If it is, the flow proceeds to Step 130, and otherwise goes to Step 128.

At Step 128, it is judged whether there is any machine language instruction to be next processed. If there is, the flow goes back to Step 125, and otherwise goes back to Step 122.

At Step 130 in FIG. 7, it is judged whether the option direction unit 6 received a request for overflow compensation from the user. If it does, the flow proceeds to Step 131, and otherwise goes back to Step 128.

At Step 131, the variable type of the individual instruction is determined by referring to the symbol table.

At Step 132, it is judged whether the individual instruction is character type, short integer type, or integer type. If it is character type, the flow goes to Step 133. If it is integer type, the flow goes back to Step 128, and otherwise proceeds to Step 136.

At Step 133, it is judged whether a character type variable is signed or unsigned. If it is signed, the flow goes to Step 134, and otherwise proceeds to Step 135.

At Step 134, a signed character type variable is sign-extended. In other words, an instruction with the smallest word length is generated to sign-extend the 8-bit signed character type variable as far as 32 bits.

At Step 135, an unsigned character type variable is zero-extended. In other words, an instruction with the smallest word length is generated to zero-extend the 8-bit unsigned character type variable as far as 32 bits.

At Step 136, it is judged whether a short integer type variable is signed or unsigned. If it is signed, the flow goes to Step 137, and otherwise proceeds to Step 138.

At Step 137, a signed short integer type variable is sign-extended. In other words, an instruction with the smallest word length is generated to sign-extend the 16-bit signed integer type variable as far as 32 bits.

At Step 138, an unsigned short integer type variable is zero-extended. In other words, an instruction with the smallest word length is generated to zero-extend the 16-bit unsigned integer type variable as far as 32 bits.

The operations of the compiler 2 and the hardware 4 constructed as explained above are described as follows. To simplify the explanation, the following C language program is used as an example.

```
main ( )
{
    char        a ;
    unsigned char   b ;
    short int   c ;
    unsigned short int  d ;
    a = a + 1 ;
    b = b + a ;
    c = c + b ;
    d = d + c ;
}
```

The C language program is read out from the storage unit 1 by the code generation unit 5 and its language structure is analyzed in accordance with C language grammar. Based on the analysis, the code generation unit 5 generates an intermediate file written in the intermediary format language (Step 120).

The contents of the intermediate file is shown below; however, it is revised so that the description of the intermediary format is understood.

| intermediary format sentence 1 : | (char  a) |
| intermediary format sentence 2 : | (unsigned char  b) |
| intermediary format sentence 3 : | (short int  c) |
| intermediary format sentence 4 : | (short int  d) |
| intermediate instruction 1 : | (a = a + 1) |
| intermediate instruction 2 : | (b = b + a) |
| intermediate instruction 3 : | (c = c + d) |
| intermediate instruction 4 : | (d = d + c) |

In the event of an intermediate file input, the code generation unit 5 extracts data variables in the file (including non-declared data variables), determines the variable types, and allocates the variables to the memory 8 if necessary, thereby forming the symbol table shown in FIG. 4 (Step 121).

Variables "a", "b", "c", and "d", which are explicitly declared are extracted from the intermediary format sentences 1–4. The variable type for each variable is determined based on the declaration and then registered to the symbol table and further allocated in the memory 8. In this case, the variables "a", "b", "c", and "d" are allocated to the areas corresponding to 1 byte starting from an address 1000, 1 byte starting from an address 1001, 2 bytes starting from an address 1002, and 2 bytes starting from an address 1004 respectively. The contents of the symbol table is dynamically updated in the event of any change. The symbol table shown in FIG. 8 indicates the contents at this time.

After this, the code generation unit 5 generates machine language instructions corresponding to each of the intermediate instructions as follows.

(1) When overflow compensation is not requested

The code generation unit 5 reads out a leading intermediate instruction among unprocessed intermediate instructions (Step 123), and selects one or more machine language instructions to realize the read intermediate instruction (Step 124).

The instruction selecting procedure is described as follows.

The intermediate instruction 1 ($a=a+1$) indicates (1) to read 1-byte data starting from the address 1000 where the signed character type variable "a" is allocated, (2) to add 1 to the data, and (3) to store it to the address 1000. The code generation unit 5 selects machine instructions corresponding (1)–(3) so as to realize the instruction. That is, three instructions are selected: (1) MOVB instruction for reading out the 1-byte data starting from the address 1000 and storing it to the data register, (2) ADD instruction for adding 1 to the data stored in the data register, and (3) MOVB instruction for returning the add operation result to the address 1000. The data register is assumed to be allocated D0.

With no overflow compensation request, the code generation unit 5 generates the following instructions 1–3 by providing three individual instructions with three time loop processes (Steps 124–128).

| instruction 1 | : | address 00100000 | MOVB | @1000, D0 |
| instruction 2 | : | address 00100004 | ADD | #1, D0 |
| instruction 3 | : | address 00100006 | MOVB | D0, @1000 |

In the same manner, the code generation unit 5 generates the following instructions 4–6 from the intermediate instruction 2 ($b=b+a$).

| instruction 4 | : | address 00100009 | MOVBU | @1000, D1 |
| instruction 5 | : | address 0010000c | ADD | D0, D1 |
| instruction 6 | : | address 0010000d | MOVB | D1, @1001 |

In the same manner, the code generation unit 5 generates the following instructions 7–9 from the intermediate instruction 3 ($c=c+d$).

| instruction 7 | : | address 00100010 | MOVH | @1002, D0 |
| instruction 8 | : | address 00100013 | ADD | D1, D0 |
| instruction 9 | : | address 00100014 | MOVH | D0, @1002 |

In the same manner, the code generation unit 5 generates the following instructions 10–12 from the intermediate instruction 4 ($d=d+c$).

| instruction 10 | : | address 00100017 | MOVHU | @1004, D1 |
| instruction 11 | : | address 0010001b | ADD | D0, D1 |
| instruction 12 | : | address 0010001c | MOVH | D1, @1004 |

These instructions 1–12 are written in mnemonic object codes (assembly language) for convenience and are described in binary when stored in the memory 8. All these numbers appearing above are hexadecimal. It is assumed that the instructions 1–12 are allocated to 31 bytes extending between the addresses 100000 and 10001e. No instruction is generated for compensating overflows.

Then, these object codes are executed by the micro computer 7 as follows.

(instruction 1)

Data for 8 bits in the variable "a" are read out from an address 001000 in the memory 8 by the bus control circuit 11, sign-extended as far as 32 bits, and stored in the D0 register in the register 13.

(instruction 2)

1 is added to the data stored in the D0 register by the calculator 14, and the calculated result is again stored in the D0 register. The ADD operation is intended for all the 32 bits.

(instruction 3)

The lower 8 bits of the data stored in the D0 register is written to an address 00001000 in the memory 8 by the bus control circuit 11.

(instruction 4)

Data for 8 bits in the variable "b" are read out from an address 00001001 in the memory 8 by the bus control circuit 11, zero-extended as far as 32 bits, and stored in the D1 register in the register 13.

(instruction 5)

Data in the D1 register are added to the data stored in the D0 register by the calculator 14, and the calculated result is again stored in the D1 register. Before the ADD operation, the D0 register stores data of the variable "a", which have been updated by the instruction 2. The ADD operation is intended for all the 32 bits.

(instruction 6)

The lower 8 bits of the data stored in the D1 register is written to an address 00001001 in the memory 8 by the bus control circuit 11.

(instruction 7)

Data for 16 bits in the variable "c" are read out from an address 00001002 in the memory 8 by the bus control circuit 11, sign-extended as far as 32 bits, and stored in the D0 register in the register 13.

(instruction 8)

Data in the D0 register are added to the data stored in the D1 register by the calculator 14, and the calculated result is again stored in the D0 register. Before the ADD operation, the D1 register stores data of the variable "b", which have been updated by the instruction 5. The ADD operation is intended for all the 32 bits.

(instruction 9)

The lower 16 bits of the data stored in the D0 register is written to an address 00001002 in the memory 8 by the bus control circuit 11.

(instruction 10)

Data for 16 bits in the variable "d" are read out from an address 001004 in the memory 8 by the bus control circuit 11, zero-extended as far as 32 bits, and stored in the D1 register in the register 13.

(instruction 11)

Data in the D1 register are added to the data stored in the D0 register by the calculator 14, and the calculated result is again stored in the D1 register. Before the ADD operation, the D0 register stores data of the variable "c", which have been updated by the instruction 8. The ADD operation is intended for all the 32 bits.

(instruction 12)

The lower 16 bits of the data stored in the D1 register is written to an address 00001004 in the memory 8 by the bus control circuit 11.

Thus, the C language program is compiled by the compiler 2, and generated object codes are executed in the micro computer 7. Since no instruction is generated to compensate overflows, there are no increase in code size and no decrease in execution speed.

(2) When overflow compensation is requested

The code generation unit 5 operates in the same manner as the above explained case (1) except that overflow compensation is executed in Step 130. In Step 130, overflow is compensated if individual instruction generation carried out at Step 127 is for an arithmetic operation, and accordingly, process after the generation is different as follows.

| instruction 2  | : | ADD | #1, D0 |
| instruction 5  | : | ADD | D0, D1 |
| instruction 8  | : | ADD | D1, D0 |
| instruction 11 | : | ADD | D0, D1 |

The process after the instruction generation is described as follows.

(Overflow compensation for the instruction 2)

After the instruction 2 is generated (Step 126), the code generation unit 5 refers to the symbol table shown in FIG. 8 because it is an arithmetic instruction (Step 127) and overflow compensation is designated (Step 130). At this point, in the symbol table, the D0 register is assigned to the variable "a". As a result, it becomes apparent that the a variable "a" is a signed character type variable (Steps 131, 132, and 133). Accordingly, the code generation unit 5 generates an instruction 2' with smallest word length in order to sign-extend the 8-bit variable "a" in the D0 register as far as 32 bits (Step 134).

instruction 2': EXTXB D0

(Overflow compensation for the instruction 5)

After the instruction 5 is generated (Step 126), the code generation unit 5 refers to the symbol table because it is an arithmetic instruction (Step 127) and overflow compensation is designated (Step 130). At this point, in the symbol table shown in FIG. 8, the D1 register is allocated to the variable "b". As a result, it becomes apparent that the variable "b" is an unsigned character type variable (Steps 131, 132, and 133). Accordingly, the code generation unit 5 generates an instruction 5' with smallest word length in order to zero-extend the 8-bit variable "b" in the D1 register as far as 24 bits (Step 135).

instruction 5': EXTXBU D1

(Overflow compensation for the instruction 8)

After the instruction 8 is generated (Step 126), the code generation unit 5 refers to the symbol table because it is an arithmetic instruction (Step 127) and overflow compensation is designated (Step 130). At this point, in the symbol table, the D0 register is allocated to the variable "c". As a result, it becomes apparent that the a variable "c" is a signed short integer type variable (Steps 131, 132, and 133). Accordingly, the code generation unit 5 generates an instruction 8' with smallest word length in order to sign-extend the 16-bit variable "c" in the D0 register as far as 32 bits (Step 137).

instruction 8': EXTXH D0

(Overflow compensation for the instruction 11)

After the instruction 11 is generated (Step 126), the code generation unit 5 refers to the symbol table because it is an arithmetic instruction (Step 127) and overflow compensation is designated (Step 130). At this point, in the symbol table shown in FIG. 8, the D1 register is allocated to the variable "d". As a result, it becomes apparent that the variable "d" is an unsigned short integer type variable (Steps 131, 132, and 133). Accordingly, the code generation unit 5 generates an instruction 11' with smallest word length in order to zero-extend the 16-bit variable "d" in the D1 register as far as 32 bits (Step 138).

instruction 11': EXTXHU D1

According to these procedures, the code generation unit 5 generates the following object codes.

| instruction 1 | : address 00100000 | MOVB | @1000, D0 |
| instruction 2 | : address 00100004 | ADD | #1, D0 |
| instruction 2' | : address 00100006 | EXTXB | D0 |
| instruction 3 | : address 00100007 | MOVB | D0, @1000 |
| instruction 4 | : address 0010000a | MOVBU | @1001, D1 |
| instruction 5 | : address 0010000d | ADD | D0, D1 |
| instruction 5' | : address 0010000e | EXTXBU | D1 |
| instruction 6 | : address 0010000f | MOVB | D1, @1001 |
| instruction 7 | : address 00100012 | MOVH | @1002, D0 |
| instruction 8 | : address 00100015 | ADD | D1, D0 |
| instruction 8' | : address 00100016 | EXTXH | D0 |
| instruction 9 | : address 00100017 | MOVH | D0, @1002 |
| instruction 10 | : address 0010001a | MOVHU | @1004, D1 |
| instruction 11 | : address 0010001e | ADD | D0, D1 |
| instruction 11' | : address 0010001f | EXTXHU | D1 |
| instruction 12 | : address 00100020 | MOVH | D1, @1004 |

It is assumed that these instructions 1–12 are allocated in 35 bytes corresponding to the addresses 00100000–00100022 in the memory 8. The instructions 2', 5', 8', and 11' are amendment instructions for the signed character type data variable "a", the unsigned character type data variable "b", the signed short integer type data variable "c", and the unsigned short integer type data variable "d" respectively. These amendment instructions compensate overflows which may be caused in ADD instructions in the instructions 2, 5, 8, and 11 respectively.

After this, these object codes stored in the memory 8 are executed by the micro computer 7 as follows. Since the execution is almost the same as (1), the following description is limited to instructions different from (1).
(instruction 2')
The lower 8 bits of the data in the D0 register in the register 13 are sign-extended by the first extender 15, and the result is again stored in the D0 register.
(instruction 5')
The lower 8 bits of the data in the D1 register in the register 13 are zero-extended by the first extender 15, and the result is again stored in the D1 register.
(instruction 8')
The lower 16 bits of the data in the D0 register in the register 13 are sign-extended by the second extender 16, and the result is again stored in the D0 register.
(instruction 11')
The lower 16 bits of the data in the D1 register in the register 13 are zero-extended by the second extender 16, and the result is again stored in the D1 register.

The instructions 2, 5, 8, and 11, which may cause overflows are applied overflow amendment by the above-explained instructions 2', 5', 8', and 11' respectively.

Thus, C language programs are compiled by the compiler 2, and produced object codes are executed by the micro computer 7. Although the instructions 8' and 11' for compensating overflows are generated also for short integer type data variables in this case, these instructions 8' and 11' as well as the instructions 2' and 5' for compensating overflow in character type data variables are composed of instructions having 1 byte word length so that the increase in code size and the decrease in execution speed are fairly low.

As explained hereinbefore, when programs with no overflow are compiled or when overflows can be avoided by programmers' checking the value range of each data variable, the increase in the code size of object codes and the decrease in execution speed can be prevented by users' providing the compiler 2 with option designation for not compensating overflows, regardless of the data variable type.

Although the first and second extenders 15 and 16 are independent of the calculator 14 in this embodiment, the calculator 14 may include the functions of the extenders 15 and 16.

Although C language programs are used in the embodiment, programs in any language can be executed by adjusting the compiler 2 to the language.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An apparatus for converting a high level computer language program into a machine language program, said apparatus comprising:

user direction means for holding a user direction which indicates whether overflows should be compensated;

conversion means for converting the high level language program into the machine language program; and instruction generation means for, if said direction holding means currently holds a user direction for compensating overflows, judging a type of a data variable, which is specified by an operand of an arithmetic instruction in the machine language program, and generating, according to the type of the data variable, an amendment instruction for compensating an overflow which may be caused by the arithmetic instruction, wherein an effective width of the data variable is shorter than a width of a register which stores the variable, wherein said amendment instruction generated by the instruction generation means is added to the machine language program immediately after the arithmetic instruction.

2. The apparatus of claim 1, wherein said instruction generation means comprises:

instruction selection means for selecting arithmetic instructions where an overflow may occur from all of said machine language instructions that can be generated;

variable detection means for detecting effective width of a data variable in a said arithmetic instruction and for judging whether said data variable is signed or unsigned;

sign extension instruction generation means for, when said data variable is signed, generating an amendment instruction for filling higher bits than said effective width with same logical values as a sign bit, thereby matching said effective width of said data variable with said width of said register; and zero extension instruction generation means for, when said data variable is unsigned, generating an amendment instruction to fill higher bits than said effective width with zeros, thereby matching said effective width of said data variable with said width of said register.

3. The apparatus of claim 2, wherein said data variable is 32 bits wide and the number of bits in said register is an integer between 33 and 63 inclusive.

4. The apparatus of claim 2, wherein said data variable is 16 bits wide and the number of bits in said register is an integer between 17 and 31 inclusive.

5. The apparatus of claim 2, wherein said data variable is one of 16 bits wide and 8 bits wide, and the number of bits in the said register is 24.

6. A processor for executing machine language instructions generated by a program translation apparatus, said processor comprising:

means for decoding said machine language instructions including amendment instructions for compensating overflows and arithmetic instructions;

a plurality of registers having a first data width for storing data having a second data width, said data being necessary for arithmetic operations;

a calculator for performing a predetermined arithmetic operation with said data stored in said register, based on said arithmetic instruction decoded by said decoding means; and amendment means for extending an effective width of said data to said first data width, based on said amendment instructions decoded by said decoding means, said amendment instructions having a least word length.

7. The processor of claim 6, wherein said amendment means comprises:

a first extender for, when a said amendment instruction decoded indicates sign extension, filling higher bits than said effective data width with same logical values as a sign bit, thereby matching said effective width of a data variable with said first data width; and a second extender for, when a said amendment instruction decoded indicates zero extension, filling higher bits than said effective width with zeros, thereby matching said effective width of said data variable with said first data width.

8. A data processing system for translating a high level computer language program into a machine language program and for executing said machine language program, the system comprising:

a conversion means for converting the high level language into a machine language, the conversion means comprising:

user direction means for holding a user direction which indicates whether overflows should be compensated;

conversion means for converting the high level language program into the machine language program;

instruction generation means for, if said direction holding means currently holds a user direction for compensating overflows, judging a type of a data variable, which is specified by an operand of an arithmetic instruction in the machine language program, and generating, according to the type of the data variable, an amendment instruction for compensating an overflow which may be caused by the arithmetic instruction, wherein an effective width of the data variable is shorter than a width of a register which stores the variable, wherein said amendment instruction generated by the instruction generation means is added to the machine language program immediately after the arithmetic instruction; and a processor for executing the machine language program, the processor comprising:

means for decoding instructions of the machine language program, including amendment instructions for compensating overflows and arithmetic instructions;

a plurality of registers having a first data width for storing data having a second data width;

a calculator means for performing a predetermined arithmetic operation with the data stored in the registers; and amendment means for extending an effective width of the data to the first data width, based on the amendment instructions decoded by the decoding means, the amendment instructions having a minimum word length, the amendment means comprising:

a first extender for, when the decoded amendment instruction indicates sign extension, filling higher bits than the effective data width with the same logical values as a sign bit, thereby matching said effective width of a data variable with said first data width; and a second extender for, when a decoded amendment instruction indicates zero extension, filling higher bits than the effective data width with zeros, thereby matching said effective width of said data variable with said first data width.

* * * * *